March 8, 1932.   T. RAY ET AL   1,848,197
HEATER
Original Filed Jan. 18, 1928   3 Sheets-Sheet 1

Witness:
William P. Kilroy

Inventors
Joshua R. Ray
Thomas Ray
Hill & Hill
Attys

March 8, 1932. T. RAY ET AL 1,848,197
HEATER
Original Filed Jan. 18, 1928 3 Sheets-Sheet 2
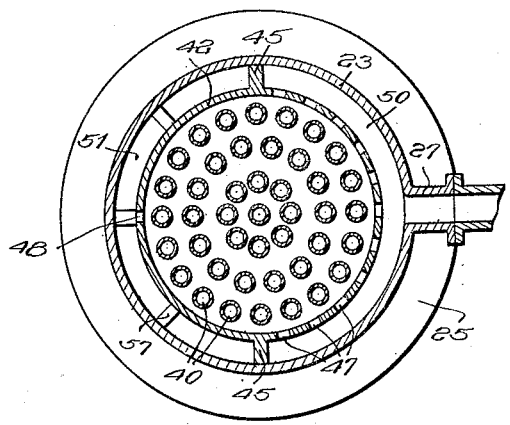
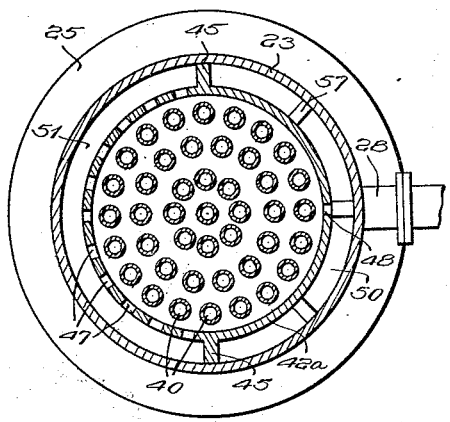
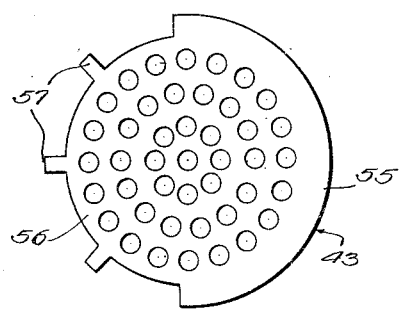
Inventors
Joshua R. Ray
Thomas Ray March 8, 1932. T. RAY ET AL 1,848,197
HEATER
Original Filed Jan. 18, 1928 3 Sheets-Sheet 3

Inventors
Joshua R. Ray
Thomas Ray
By Hill Hill
Attys.

Witness:
William P. Kilroy

Patented Mar. 8, 1932

1,848,197

UNITED STATES PATENT OFFICE

THOMAS RAY AND JOSHUA R. RAY, OF MANISTEE, MICHIGAN

HEATER

Original application filed January 18, 1928, Serial No. 247,542. Divided and this application filed June 28, 1929. Serial No. 374,552.

Our invention relates to heaters and has to do more particularly with such devices as are especially adapted to be used in conjunction with liquid evaporating and concentrating systems and apparatus.

A particular object of our invention is to provide a heater of the type referred to which will be simple in construction, inexpensive to manufacture, efficient and economical in operation, and durable.

Various other objects and advantages of the construction herein shown and described will be obvious to those skilled in the art from the disclosure herein given.

To this end our invention consists in the novel construction, arrangement and combination of parts herein shown and described, and more particularly pointed out in the claims.

Referring now to the drawings forming a part of this specification and representing certain preferred embodiments of our invention:

Fig. 2 is a sectional view taken substantially on the line 2—2 of Fig. 1;

Fig. 3 is a sectional view taken substantially on the line 3—3 of Fig. 1;

Fig. 4 is a plan view of a separator plate employed in the structure;

Figure 1:
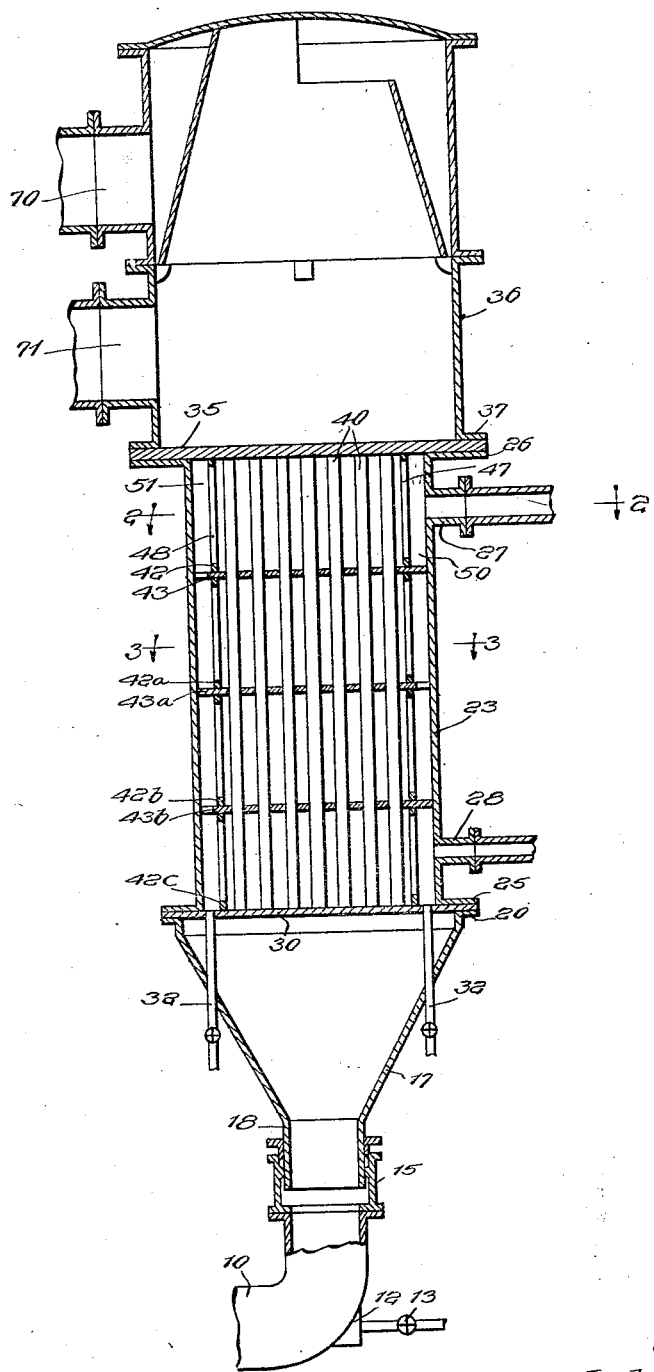
Fig. 1 illustrates a vertical sectional view of a device embodying our invention, shown in conjunction with a vapor and moisture separator.

Referring first to the device of Figs. 1 to 4, inclusive, there is provided a pipe 10 which may lead from a suitable tank or other apparatus (not shown). The pipe 10 may be provided with an outlet 12, controlled by a valve 13 through which liquid may be withdrawn when same reaches a desired point of concentration. The pipe 10 is connected by means of an expansion joint 15 to a downwardly converging frusto-conical funnel-like member 17. The funnel-like member 17 preferably terminates at its lower end in a substantially cylindrical portion 18 which forms a part of the joint 15.

The funnel-like member 17 has preferably formed on the upper portion thereof a laterally extending annular flange 20 which serves to seat a cylindrical casing 23 preferably formed of sheet metal, which casing is provided at its lower and upper extremities with laterally extending annular flanges 25 and 26, respectively. The casing 23 is also provided with a steam inlet 27 adjacent the upper portion thereof, and outlet 28 adjacent the lower portion thereof for noncondensible gases.

Arranged between the casing 23, and the funnel-like member 17 is a circular tube plate 30 which is apertured to receive outlet tubes 32 for carrying off liquid of condensation. A tube plate 35 is also provided at the upper portion of the casing 23 and disposed between the heater and a liquid and vapor separator 36, the plate 35 being seated between the annular flange 26 of the heater and a similar flange 37 formed on the separator.

Extending through the tube plates 30 and 35 and rigidly secured thereto is a plurality of tubes 40, these tubes extending longitudinally of the casing 23. Arranged within the casing 23 substantially concentrically therewith, is a plurality of cylindrical sections 42, 42a, 42b, 42c, these sections being separated from each other by means of partition sheets 43, 43a and 43b. These sheets 43 are suitably apertured for the passage of the tubes 40 and form baffles which direct the flow of heating medium.

The cylindrical sections 42, etc., have secured thereto, diametrically opposed radial lugs 45 which are preferably formed integrally with the cylindrical sections and are adapted to maintain these sections in spaced relation to the inner wall of the casing 23. These lugs extend longitudinally substantially the entire length of the cylindrical section and serve also as baffles, as will be described more in detail below. The uppermost cylindrical section 42 has a plurality of elongated apertures 47 formed therein on the side adjacent the steam inlet 27 and a single elongated aperture 48 on the side opposite thereto, as best seen in Fig. 2. These apertures extend longitudinally of the cylindrical section for nearly the entire length thereof, the apertures 47 being disposed around substantially the semicircumference of the cylindrical section. It will thus be seen that two semi-annular spaces 50 and 51 are provided around the cylindrical sections, these spaces being bounded by the lugs 45 formed on the cylindrical sections 42, etc., the inner wall of the casing 23, the outer wall of the cylindrical sections, the tube plate 35 and the partition 43, or a pair of partitions, as the case might be.

The partition 43 arranged beneath the uppermost cylindrical section 42, as best seen in Fig. 4 comprises a semi-circular portion 55 which is substantially equal in diameter to the inside diameter of the casing 23, the opposite semi-circular portion 56 being smaller in diameter so as to provide a semi-annular space between this portion of the partition and the inner wall of the casing 23. Radial supporting lugs 57 are provided on the semi-circular portion 56.

The cylindrical section 42a disposed below the uppermost section 42 is similar thereto, except that it is arranged in reverse relation to the uppermost section with regard to the plurality of apertures 47 and the single aperture 48. The third cylindrical section 42b is arranged again similarly to the uppermost one, while the lowermost cylindrical section 42c is arranged similarly to the section 42a. Also, the partition 43a is oppositely arranged to the uppermost partition 43, as seen best in Fig. 4, while the lowermost partition 43b is again arranged similarly to the uppermost one 43. It will be obvious, of course, that any number of partitions and cylindrical sections may be utilized and we are not to be limited to the particular number and arrangement shown.

Figure 7:
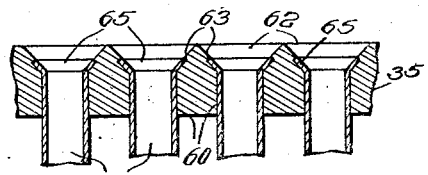
Fig. 7 is a detailed fragmentary sectional view on an enlarged scale taken on the line 7—7 of Fig. 6.

The manner of connecting the tubes 40 to the respective tube plates is shown in detail in Fig. 7, while only the upper tube plate 35 is shown, it will be readily understood that the arrangement in securing the tubes to the lower tube plate 30 is substantially similar. It will be noted that apertures 60 are formed in the plate 35 which are substantially cylindrical for a certain portion of their length and then expand to form a frusto-conical portion 62. The frusto-conical portions of the apertures are recessed as at 63 so as to seat the expanded terminal flanges 65 of the tubes 40 substantially flush with the frusto-conical portion of the apertures in the tube plate.

Figure 8:
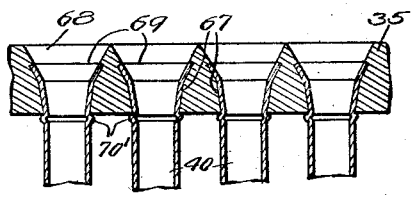
Fig. 8 is a view substantially similar to Fig. 7 but showing a modified arrangement.

In the arrangement shown in Fig. 8, the apertures provided for the tubes 40 in the tube plate 35 comprise a pair of joined frusto-conical portions 67 and 68 of different angles, the portion 68 being recessed as at 69 so as to seat the terminal flange of the tube, as in the embodiment of Fig. 7, so that this flange will be substantially flush with the wall of the aperture 68. The tubes are expanded and bent to conform with the frusto-conical portions and are provided with a crimp or bead 70' just outside of the tube plate so as to provide a very secure seat for the tube.

The separator shown at 36 in Fig. 1 will not be described in detail, inasmuch as it forms the subject-matter of our co-pending application, Serial No. 396,866, filed June 10, 1929.

The operation of the device just described is substantially as follows: Steam is introduced into the heater through the conduit 27, passing into the semi-annular chamber 50, from which chamber being restricted by the lugs 45, it enters the apertures 47 in the cylindrical section 42, circulates around the tubes 40 between the partition 43 and tube plate 35 and then passes out through the aperture 48 into the semi-annular space 51. The steam then passes down between the partition 43 and the wall of the casing 23 into the semi-annular chamber below and then enters the plurality of apertures 47, in the cylindrical section 42a, circulates around the tubes in this compartment and passes through the aperture 48 on the opposite side of the cylindrical section. Without going into further detail it will be apparent that the steam circulates back and forth in a criss-cross manner around the tubes between the partition and finally leaves the heating member 22 through the outlet 28. While this is taking place, liquid which it is desired to heat or concentrate is being introduced into the device through the tubular member 10 whence it is forced up into the tubes 40. The liquid will preferably be under some pressure and will absorb considerable heat from the steam circulating around the tubes 40. Hence the liquid will tend to spurt out of the upper extremities of the tubes in the form of vapor with varying amounts of entrained liquid, which liquid will be separated from the vapor in the separator 36. Water free vapor is permitted to leave the separator through the outlet 70 while the separated liquid is conducted away through the outlet 71.

Figure 5:
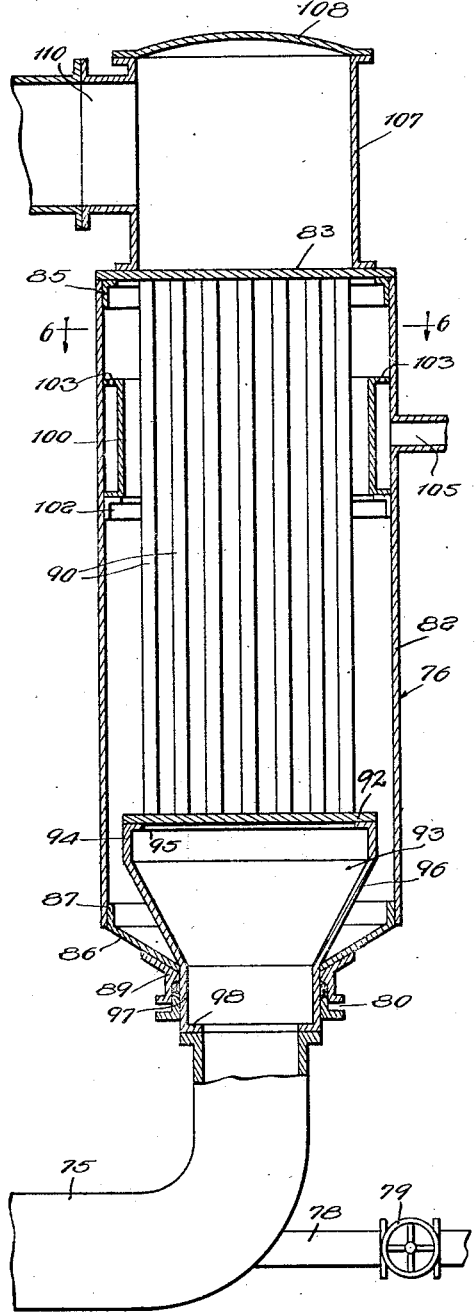
Fig. 5 is a vertical sectional view substantially similar to Fig. 1; and showing another embodiment of our invention.
Figure 6:
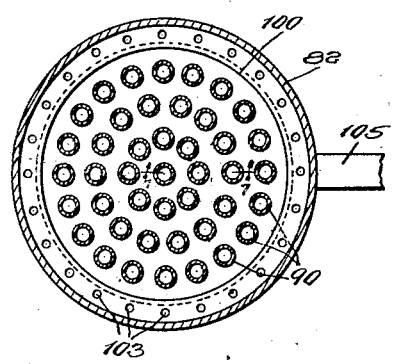
Fig. 6 is a sectional view taken substantially on the line 6—6 of Fig. 5.

Referring now to the embodiment shown in Figs. 5 and 6, a conduit 75 is provided for conducting fluid to the heating device, indicated generally at 76. An outlet 78 communicates with the conduit 75 and is controlled by a valve 79, the outlet and valve being provided to perform a function similar to the outlet 12 and valve 13. The conduit 75 may be connected to the heater 76 by means of a suitable expansion joint 80.

The heater 76 comprises a substantially cylindrical casing 82 closed at its upper end by means of a tube plate 83 reenforced by means of an annular ring 85 which is L-shaped in cross-section. At its lower end the casing 82 is closed by means of a frusto-conical sheet 86 having a cylindrical flange 87 secured to the casing 82, and at its other end being secured to an annular member 89 forming a part of the expansion joint 80.

Secured in the tube plate 83 is a plurality of tubes 90 which extend longitudinally of the casing 82 and are secured at their opposite end in a tube plate 92. This tube plate is secured to a funnel-like member 93 which comprises a cylindrical portion 94 having an inwardly extending annular flange 95, a frusto-conical portion 96, and a cylindrical portion 97 having an inwardly extending annular flange 98 abutting against the end of conduit 75. It will be seen that the cylindrical portion 97 connects by means of flange 98 with the tubular member 75 and that the portions 94 and 96 are spaced from the casing 82 and the member 86.

Arranged within the casing 82, preferably in the upper portion thereof, is a cylindrically outwardly flanged shell 100 which, as best seen in Fig. 5 is substantially channel shaped and is supported by means of ring 102. Apertures 103 are provided in the upper flange of the cylindrical shell 100 and a pipe 105 is provided for introducing steam into the shell.

Arranged above the heating member is a hood 107 which is supported on the tube plate 83 and has a cover 108 which is preferably removable and forms a fluid-tight connection with the hood. An outlet member 110 serves to conduct vapor from the hood to a separator, condenser or other suitable apparatus. It will readily be understood, however, that a separator of the type shown at 36 in Fig. 1 may be substituted for the hood 107.

It is believed that the operation of the device just described will be readily apparent to those skilled in the art. Steam is introduced into the heating device through the tube 105, from which it enters the shell 100 and passes through the apertures 103 and then circulates around the tubes 90. Liquid to be heated or concentrated, is, at the same time, forced into the heating device through the conduit 75, being permitted to expand in the funnel-like member 93 and thence forced upwardly through the tubes 90. A further expansion may take place in the hood 107 and the vapor is then forced out through the conduit 110.

This application constitutes a division of our co-pending application, Serial No. 247,542, filed January 18, 1928.

Having thus described our invention, it is obvious that various immaterial modifications may be made in the same without departing from the spirit of our invention; hence, we do not wish to be understood as limiting ourselves to the exact form, construction, arrangement, and combination of parts herein shown and described or uses mentioned.

What we claim as new and desire to secure by Letters Patent is:

1. In a device of the kind described, a tubular casing, a plurality of tubes within said casing, tube plates securing the ends of said tubes, a second tubular casing surrounding said tubes and within said first tubular casing, said second tubular casing having a plurality of apertures therein, a member providing a wall extending between said casings and means for conducting heating vapor to said first tubular casing and therefrom to said first mentioned casing.

2. In a device of the kind described, a tubular casing, a plurality of tubes within said casing, tube plates securing the ends of said tubes, a second tubular casing surrounding said tubes and within said first tubular casing, said second tubular casing having a plurality of apertures therein, a transverse apertured partition within said casings so as to provide a plurality of compartments therein whereby vapor introduced into said first casing may be induced to flow back and forth through said compartments and over said tubes.

3. In a device of the kind described, a tubular casing, a plurality of tubes within said casing, tube plates securing the ends of said tubes, a casing formed of a plurality of tubular sections surrounding said tubes and within said first tubular section, said tubular sections having a plurality of apertures therein for the passage of heating vapor, and means for directing heating vapor through said tubular sections consecutively.

4. In a device of the kind described, a tubular casing, a plurality of tubes within said casing, tube plates securing the ends of said tubes, a casing formed of a plurality of tubular sections surrounding said tubes and within said first tubular section, apertures in each section and partitions between adjacent sections so as to provide a plurality of compartments between said partitions whereby steam introduced into said first casing will be induced to flow back and forth through said compartments and over said tubes.

5. In a device of the class described, a tubular casing, a plurality of tubes extending longitudinally therein, and means for introducing steam into said casing including an annular member extending around the inside of said casing outside of said tubes in spaced relation to said casing having a wall extending between said member and casing, said wall being apertured to provide a communication with said casing.

6. In a device of the kind described, a casing, a plurality of tubular members passing through said casing, an annular partition within said casing forming compartments therein, one of which is arranged annularly of the other, a partition arranged transversely of said tubular members, said partition having apertures, and a partition extending lengthwise of the axis of said casing between said annularly arranged partition and said casing.

7. In a device of the kind described, an outer tubular casing, a plurality of tubes within said casing, tube plates securing said tubes at the ends thereof, a casing formed of a plurality of tubular sections within said outer tubular casing, partitions positioned between adjacent tubular sections, partition members joining said inner section to the outer casing, each partition being apertured outside of said inner casing on a side opposite similar apertures in adjacent partitions, each of said inner tubular sections having apertures for the passage of heating vapor.

8. In a device of the class described, a tubular casing, a plurality of tubes extending longitudinally therein, and means for introducing steam into said casing including an annular member surrounding said tubes and radially and transversely arranged walls extending between said casing and annular member, said annular member and transverse wall being apertured to allow the passage of steam from the annular member into the casing.

In witness whereof we hereunto subscribe our names this 29th day of May, A. D. 1929.

THOMAS RAY
JOSHUA R. RAY.